United States Patent
Tanaka

(10) Patent No.: US 9,684,287 B2
(45) Date of Patent: Jun. 20, 2017

(54) CONTROLLING DEVICE AND CONTROLLING METHOD

(71) Applicant: AZBIL Corporation, Tokyo (JP)

(72) Inventor: Masato Tanaka, Tokyo (JP)

(73) Assignee: AZBIL CORPORATION, Tokyo (JP)

( * ) Notice: Subject to any disclaimer, the term of this patent is extended or adjusted under 35 U.S.C. 154(b) by 558 days.

(21) Appl. No.: 14/466,142

(22) Filed: Aug. 22, 2014

(65) Prior Publication Data

US 2015/0057768 A1    Feb. 26, 2015

(30) Foreign Application Priority Data

Aug. 23, 2013   (JP) ................. 2013-173016

(51) Int. Cl.
   *G05B 13/02*   (2006.01)
   *H02J 3/14*   (2006.01)

(52) U.S. Cl.
   CPC .............. *G05B 13/021* (2013.01); *H02J 3/14* (2013.01)

(58) Field of Classification Search
   None
   See application file for complete search history.

(56) References Cited

U.S. PATENT DOCUMENTS

| | | | |
|---|---|---|---|
| 2011/0184579 A1* | 7/2011 | Nilsen | H02J 3/14 700/295 |
| 2012/0053747 A1* | 3/2012 | Tanaka | G05B 19/4188 700/295 |
| 2014/0132214 A1* | 5/2014 | Katanoda | B60L 11/1857 320/109 |

FOREIGN PATENT DOCUMENTS

JP    2012-048533    3/2012

* cited by examiner

*Primary Examiner* — Isaac T Tecklu
(74) *Attorney, Agent, or Firm* — Troutman Sanders LLP

(57) ABSTRACT

A controlling device includes an upper limit elapsed time measuring portion measuring an elapsed time TH after updating of a manipulated variable upper limit value OH1 through communication, a lower limit elapsed time measuring portion measuring an elapsed time TL after updating of a manipulated variable lower limit value OL1 through communication, an upper limit automatic reset portion storing, as a new manipulated variable upper limit value OH1, a manipulated variable upper limit value OH2 when the elapsed time TH has arrived at a specified time TR, and a lower limit automatic reset portion storing, as a new manipulated variable lower limit value OL1, a manipulated variable lower limit value OL2 when the elapsed time TL has arrived at the specified time TR.

15 Claims, 10 Drawing Sheets

CONTROLLING DEVICE AND CONTROLLING METHOD

CROSS REFERENCE TO RELATED APPLICATION

This application claims priority under 35 U.S.C. §119 to Japanese Patent Application No. 2013-173016, filed on Aug. 23, 2013, the entire content of which being hereby incorporated herein by reference.

FIELD OF TECHNOLOGY

The present invention relates to a lower-level controlling device that is used in combination with a higher-level device when a control solution for an operation for setting a manipulated variable upper limit value and/or a manipulated variable lower limit value is performed through a communication from the higher-level device.

BACKGROUND

Given, for example, legislation arising from the global warming problem, there are demands for strengthened control of the quantity of energy used in factories and manufacturing lines. Because heat-producing equipment and air-conditioning equipment are facilities equipment that can consume a particularly large quantity of electricity, often the upper limit for the quantity of energy consumed is controlled so as to be kept lower than the maximum value in conventional equipment. For example, in facilities equipment that runs on electric power, the operations are performed in particular so that the quantity of electricity used will be within specific limitations prescribed by an electric power demand controlling system.

In particular, there have been proposals for methods, using, for example, a total power suppression control device, for limiting the total quantity of electric power that is supplied simultaneously at the time of startup in heat-producing equipment that is provided with a plurality of electric heaters (when heating up simultaneously the temperature in multiple areas wherein electric heaters are installed). See, for example, Japanese Unexamined Patent Application Publication No. 2012-048533 (the "JP '533"). FIG. 8 is a block diagram illustrating the structure of a conventional heated device disclosed in the JP '533. The heating device comprises: a heat treatment furnace 100 for heating an object to be heated; heaters H1 through H4, which are a plurality of control actuators disposed within the heat treatment furnace 100; a plurality of temperature sensors S1 through S4 that measure the temperatures of regions that are heated by the respective heaters H1 through H4; a total electric power limiting/controlling device higher-level controlling portion 101 for calculating the manipulated variables MV1 through MV4 from the outputs of the heaters H1 through the H4; a total electric power limiting/controlling device lower-level controlling portion 102; and electric power regulators 103-1 through 103-4, for providing to the respective heaters H1 through H4, electric power in accordance with the manipulated variables MV1 through MV4 that are outputted from the total electric power limiting/controlling device 102.

The higher-level controlling portion 101 of the total electric power limiting controlling device receives, from a higher-level PC 104, which is a computer of the electric power demand controlling system that controls the electric power, information regarding the total allocated power PW that regulates the amount of electric power used by the heaters H1 through H4, and then calculates the total electric power used TW, which is the total of the electric powers used by the individual heaters H1 through H4, and calculates manipulated variable upper limit values OH1_1 through OH1_4 for the individual control loops so that the total electric power used TW does not exceed the total allocated electric power PW.

The lower-level controlling portion 102 of the total power limiting/controlling device is structured from temperature regulators C1 through C4, which are structured from a plurality of control loops Ri (where i=1 through n), where, in the example in FIG. 8, the number n control loops is n=4. The individual temperature regulators C1 through C4 each calculate the respective manipulated variables MV1 through MV4, through, for example, PID control calculations, and execute upper limit limiting processes so as to control the manipulated variables MV1 through MV4 so as to be no higher than the manipulated variable upper limit value OH1_1 through OH1_4, and then output, to the electric power regulators 103-1 through 103-4 of the corresponding control loops, the manipulated variables MV1 through MV4 after the upper limit processing. The control of the total power is achieved through manipulating the manipulated variable upper limit value OH1_1 through OH1_4 of the temperature regulators C1 through C4 in this way.

In the total electric power limiting/control disclosed in the JP '533, an ordinary temperature controller can be used as the lower-level controlling portion 102. That is, this is an easy approach at instrumentation for the device manufacturer. Moreover, there is no limit to only a manipulated variable upper limit value OH, but rather many different customized controls can be produced through operations for setting appropriately the manipulated variable lower limit value OL in a lower-level controlling portion 102 from a higher-level controlling portion 101.

Note that the manipulated variable lower limit value OL and the manipulated variable upper limit value OH are sent through a communication function from the higher-level controlling portion 101 to the lower-level controlling portion 102. In this case, if, after a value that is higher than normal or a value that is lower than normal is set temporarily, as the manipulated variable lower limit value OL or the manipulated variable upper limit value OH, from the higher-level controlling portion 101 and a fault occurs in the communication function prior to the value being returned to the normal value, this may cause the manipulated variable lower limit value OL or the manipulated variable upper limit value OH to remain, over an extended period of time, at a value that is larger than the normal value or a value that is smaller than the normal value. This type of unanticipated setting can produce major malfunctions in control, or other problems.

For example, let us assume that the manipulated variable upper limit value OH calculating algorithm for the total electric power suppression control disclosed in the JP '533 were executed in the higher-level controlling portion 101, and calculated manipulated variable upper limit value OH were sent continuously to the lower-level controlling portion 102 (the temperature regulator) through a communication function. FIG. 9 (A) and FIG. 9 (B) will be used to explain the problems that occur when the manipulated variable upper limit value OH is locked in for an unanticipated long period of time due to a fault in the communication function that ties together the higher-level controlling portion 101 and the temperature regulator at this time. FIG. 9 (A) illustrates the change in a process variable PV (which, in the example in FIG. 8, is a temperature measurement value), and FIG. 9 (B) illustrates the change in the manipulated variable MV.

Let us assume that, for convenience in the distribution of electric power, the manipulated variable upper limit value OH is changed, temporarily, from 100% to 20% at a time t1 for the temperature regulator of a PID control loop wherein there is no call for increasing the temperature (that is, for a temperature regulator wherein the temperature setting value SP has been changed from 300° C. to 150° C., as shown in FIG. 9 (A)). If, at this point, a fault were to occur in the communication function when the manipulated variable upper limit value OH has been set to 20%, then despite the actual need for the manipulated variable upper limit value to be returned to OH=100%, as illustrated by the dotted line 130, in the temperature regulator the manipulated variable upper limit value OH will remain set at 20%. Given this, if the communication fault is not resolved, then when, at time t2, when the temperature setting value SP for this temperature regulator is changed from 150° C. to 300° C. to begin increasing the temperature, the manipulated variable upper limit value OH will still be set to 20%, so that, at time t2 and beyond, a serious deficiency in the heating performance will occur, which will tie into major problems in terms of the operating state of the heating device.

Conversely, let us assume that, for example, some sort of specialty algorithm is executed by the higher-level controlling portion 101, to sequentially set manipulated variable lower limit values OL in the lower-level controlling portion 102 (a temperature regulator) through a communication function. FIG. 10 (A) and FIG. 10 (B) will be used to explain the problems that occur when the manipulated variable lower limit value OL is locked in for an unanticipated long period of time due to a fault in the communication function that ties together the higher-level controlling portion 101 and the temperature regulator at this time. FIG. 10 (A) illustrates the change in a process variable PV (a temperature measurement value), and FIG. 10 (B) illustrates the change in the manipulated variable MV.

At time t3, the temperature setting value SP is changed from 150° C. to 300° C., and, in response, at time t4, the manipulated variable lower limit value OL is changed temporarily from 0% to 80% for the temperature regulator that is the subject in order to force a rapid increase in temperature. If, at this point, a fault were to occur in the communication function when the manipulated variable lower limit value OL has been set to 80%, then despite the actual need for the manipulated variable lower limit value to be returned to OL=0%, as illustrated by the dotted line 140, in the temperature regulator the manipulated variable lower limit value OH will remain set at 80%. Given this, if the communication fault is not resolved, then the process variable PV of the temperature regulator will rise rapidly, and even after reaching a stage wherein there should be a transition to a high temperature maintenance state at time t5, the manipulated variable lower limit value OL will remain set at 80%, preventing the transition to the maintenance state after time t5, which would produce a dangerous temperature overage.

In this way, there is a problem in that, when a specialized processing technology wherein the settings for the manipulated variable lower limit value OL and the manipulated variable upper limit value OH that are used in a lower-level device are set is achieved through a communication function between the higher-level device and the lower-level device, if the manipulated variable lower limit value OL or the manipulated variable upper limit value OH is unexpectedly locked in due to a failure in the communication function, this can lead to a serious or dangerous malfunction. The total electric power limiting control disclosed in the JP '533 is a typical example of a control solution that uses a manipulated variable lower limit value OL and a manipulated variable upper limit value OH, and the problem described above is a problem that is common to this type of control solution.

The present invention was created in order to solve the problem set forth above, and the object thereof is to provide a controlling device and controlling method able to mitigate the problems when a fault occurs in the communication function when a control solution wherein an operation is performed through communication from a higher-level device to set a manipulated variable upper limit value and/or a manipulated variable lower limit value.

SUMMARY

A controlling device according to the present invention includes: a manipulated variable limit value storing portion that stores a first manipulated variable limit value that is either a manipulated variable lower limit value or a manipulated variable upper limit value that can be set arbitrarily through communication; a normal limit value storing portion that stores a second manipulated variable limit value that is a normal value for the first manipulated variable limit value; a controlling/calculating portion that calculates a manipulated variable MV; a limit processing portion that performs an upper limit limiting process for limiting the manipulated variable MV to a value that is no more than a manipulated variable upper limit value indicated by the first manipulated variable limit value, the manipulated variable MV calculated by the controlling/calculating portion, and/or a lower limit limiting process for limiting to a value that is no less than a manipulated variable lower limit value that is indicated by the first manipulated variable limit value; a manipulated variable outputting portion that outputs to the control subject the manipulated variable MV that has been subjected to the limiting process; a specified time interval storing portion that stores a specified time interval TR; an elapsed time measuring portion that measures time that has elapsed after the first manipulated variable limit value has been updated through communication from the higher-level device; and an automatic reset portion that causes the second manipulated variable limit value, which is stored in the normal limit value storing portion, to be stored in the manipulated variable limit value storing portion as a new first manipulated variable limit value when the elapsed time reaches the specified time interval TR.

One example configuration of a controlling device according to the present invention further includes: a reference time interval recording portion that records a reference time interval TXm based on the elapsed time when the first manipulated variable limit value has been updated through communication prior to the elapsed time arriving at the specified time interval TR; and a specified time interval setting portion that stores, as a new specified time interval TR in the specified time interval storing portion, a time interval that is a real-number multiple of the reference time interval TXm.

In one example configuration of a controlling device according to the present invention, the reference time interval recording portion uses, as the reference time interval TXm, a time interval that is the average of the elapsed times measured in the past, or use, as the reference time interval TXm, a time interval that is the longest of the time elapsed intervals measured in the past.

In one example configuration of a controlling device according to the present invention, the specified time interval storing portion stores, as a new specified time interval TR, a specified time interval that it has been transmitted, when a specified time interval to be set is transmitted simultaneously with the transmission of a first manipulated variable limit value that is to be set, from the higher-level device.

Moreover a controlling device according to the present example includes: a manipulated variable upper limit storing portion that stores a manipulated variable upper limit value OH1 that can be set arbitrarily through communication; a manipulated variable lower limit storing portion that stores a manipulated variable lower limit value OL1 that can be set arbitrarily through communication; a normal upper limit storing portion that stores a manipulated variable upper limit value OH2 that is a normal value for the manipulated variable upper limit value OH1; a normal lower limit storing portion that stores a manipulated variable lower limit value OL2 that is a normal value for the manipulated variable lower limit value OL1; a controlling/calculating portion that calculates a manipulated variable MV; an upper limit processing portion that performs an upper limit limiting process to control a manipulated variable MV, calculated by the control calculating portion, to a value that is no greater than the manipulated variable upper limit value OH1; a lower limit processing portion that performs a lower limit limiting process to control a manipulated variable MV, calculated by the control calculating portion, to a value that is no less than the manipulated variable lower limit value OL1; a manipulated variable outputting portion that outputs to the control subject the manipulated variable MV that has been subjected to the upper and lower limit limiting processes; a specified time interval storing portion that stores a specified time interval TR; an upper limit elapsed time measuring portion that measures the upper limit elapsed time TH since updating of the manipulated variable upper limit value OH1 through communication from the higher-level device; a lower limit elapsed time measuring portion that measurers the lower limit elapsed time TL since updating of the manipulated variable lower limit value OL1 through communication from the higher-level device; an upper limit automatic reset portion that stores, as a new manipulated variable upper limit value OH1, in the manipulated variable upper limit value storing portion, the manipulated variable upper limit value OH2 that is stored in the normal upper limit value storing portion, when the elapsed time TH has arrived at the specified time interval TR; and a lower limit automatic reset portion that stores, as a new manipulated variable lower limit value OL1, in the manipulated variable lower limit value storing portion, the manipulated variable lower limit value OL2 that is stored in the normal lower limit value storing portion, when the elapsed time TL has arrived at the specified time interval TR.

One example configuration of a controlling device according to the present invention further includes: an upper limit reference time interval recording portion that records a reference time interval THm based on the elapsed time TH when the manipulated variable upper limit value OH1 has been updated through communication prior to the elapsed time TH arriving at the specified time interval TR; a lower limit reference time interval recording portion that records a reference time interval TLm based on the elapsed time TL when the manipulated variable lower limit value OL1 has been updated through communication prior to the elapsed time TL arriving at the specified time interval TR; a specified time interval setting portion that stores, as a new specified time interval TR in the specified time interval storing portion, a time interval that is a real-number multiple of a value based on the reference time interval THm and or TLm.

In one example configuration of a controlling device according to the present invention, the upper limit reference time interval recording portion uses, as the reference time interval THm, a time interval that is the average of the elapsed times TH measured in the past, or use, as the reference time interval THm, a time interval that is the longest of the elapsed times TH measured in the past. The lower limit reference time interval recording portion uses, as the reference time interval TLm, a time interval that is the average of the elapsed times TL measured in the past, or use, as the reference time interval TLm, a time interval that is the longest of the elapsed times TL measured in the past. The specified time interval setting portion sets, as a new specified time interval TR, a time interval that is a real-number multiple of the reference time interval THm or TLm, whichever is longer, or set, as a new specified time interval TR the average time interval of the reference time intervals THm and TLm.

In one example configuration of a controlling device according to the present invention, the specified time interval storing portion stores, as a new specified time interval TR, a specified time interval that it has been transmitted, when a specified time interval to be set is transmitted simultaneously with the transmission of a manipulated variable upper limit value OH1 and/or a manipulated variable lower limit value OL1 that is to be set, from the higher-level device.

A controlling method according to the present invention includes: an updating step for updating, through communication from a higher if in level device, a first manipulated variable limit value that is either a manipulated variable lower limit value or a manipulated variable upper limit value that is stored in an manipulated variable limit value storing portion; a controlling/calculating step for calculating a manipulated variable MV; a limit processing step for performing an upper limit limiting process for limiting the manipulated variable MV to a value that is no more than a manipulated variable upper limit value indicated by the first manipulated variable limit value, the manipulated variable MV calculated by the controlling/calculating step, and/or a lower limit limiting process for limiting, to a value that is no less than a manipulated variable lower limit value that is indicated by the first manipulated variable limit value; a manipulated variable outputting step for outputting to the control subject the manipulated variable MV that has been subjected to the limiting process; an elapsed time measuring step for measuring time that has elapsed after the first manipulated variable limit value has been updated through communication from the higher-level device; and an automatic reset step for causing the second manipulated variable limit value, which is stored in a normal limit value storing portion, to be stored in the manipulated variable limit value storing portion as a new first manipulated variable limit value when the elapsed time reaches the specified time interval TR stored in the specified time interval storing portion.

Moreover a controlling method according to the present example includes: a manipulated variable upper limit updating step for updating, through communication from a higher-level device, a manipulated variable upper limit value OH1 that is stored in a manipulated variable upper limit storing portion; a manipulated variable lower limit updating step for updating, through communication from a higher-level device, a manipulated variable lower limit value OL1 that is stored in a manipulated variable lower limit storing portion; a controlling/calculating step for calculating a manipulated variable MV; an upper limit processing step for performing an upper limit limiting process to control a manipulated variable MV, calculated by the control calculating step, to a value that is no greater than the manipulated variable upper limit value OH1; a lower limit processing step for performing a lower limit limiting process to control a manipulated variable MV, calculated by the control calculating step, to a value that is no less than the manipulated variable lower limit value OL1; a manipulated variable outputting step for outputting to the control subject the manipulated variable MV that has been subjected to the upper and lower limit limiting processes; an upper limit elapsed time measuring step for measuring the upper limit elapsed time TH since updating of the manipulated variable upper limit value OH1 through communication from the higher-level device; a lower limit elapsed time measuring step for measuring the lower limit elapsed time TL since updating of the manipulated variable lower limit value OL1 through communication from the higher-level device; an upper limit automatic reset step for storing, as a new manipulated variable upper limit value OH1, in the manipulated variable upper limit value storing portion, the manipulated variable upper limit value OH2 that is stored in the normal upper limit value storing portion as a normal value for the manipulated variable upper limit value OH1, when the elapsed time TH has arrived at the specified time interval TR stored in a specified time interval storing portion; and a lower limit automatic reset step for storing, as a new manipulated variable lower limit value OL1, in a manipulated variable lower limit value storing portion, the manipulated variable lower limit value OL2 that is stored in the normal lower limit value storing portion as a normal value for the manipulated variable lower limit value OL1, when the elapsed time TL has arrived at the specified time interval TR.

The present invention is structured so as to achieve the specialty processing technology, wherein the settings for manipulated variable limit values used by a controlling device are manipulated, through a communication function between the higher-level device and the lower-level controlling device so that even if a communication fault were to occur so that the manipulated variable limit value could not be returned to the normal value from the higher-level device, still the manipulated variable limit value can be caused to fall back automatically to the normal value after a specified time interval TR. That is, the problem that is the possibility that the manipulated variable limit value is set to a value that is different from the normal value for an extended period of time can be mitigated.

Moreover, in the present invention, a reference time interval TXm is recorded, based on the elapsed time, when a manipulated variable limit value is updated through communication, and a time that is a real-number multiple of the reference time interval TXm is stored in the specified time storing portion as a new specified time TR, enabling the specified time TR that is stored in the in the controlling device to be set to an appropriate value.

Moreover, in the present invention, when a specified time that should be set is transmitted simultaneously with the transmission of a manipulated variable limit value that should be set, from a higher-level device, the specified time that has been transmitted is stored, as a new specified time TR, in the specified time storing portion of the controlling device, thus enabling a specified time TR that is matched to the manipulated variable limit value that is set temporarily to be specified as demanded by the circumstances from the higher-level device.

Moreover, the present invention enables an automatic reset of the manipulated variable lower limit value OL1 and/or the manipulated variable upper limit value OH1 to the normal value, with a specified time interval TR, even in a case wherein, due to the occurrence of a fault in the communication function, it is not possible for the manipulated variable lower limit value OL1 or the manipulated variable upper limit value OH1 to be returned, by the higher-level device, to the normal value in a structure wherein a specialized processing technology for manipulating the settings for the manipulated variable lower limit value OL1 or the manipulated variable upper limit value OH1, used by a controlling device, through a communication function between a higher-level device and a controlling device on a lower level. That is, this makes it possible to mitigate problems that occur due to the manipulated variable lower limit value OL1 or the manipulated variable upper limit value OH1 being locked in to a value that is different from the normal value over an extended period of time.

Moreover, in the present invention, not only is a reference time interval THm recorded based on an elapsed time TH when the manipulated variable upper limit value OH1 has been updated through communication, but also a reference time interval TLm is recorded based on an elapsed time TL when the manipulated variable lower limit value OL1 has been updated through communication, to store, as a new specified time TR, in the specified time storing portion, a real-number multiple of a value that is based on the reference time interval THm and/or TLm, enabling the specified time TR that is stored in the controlling device to be set appropriately.

Moreover, in the present invention, when a specified time that should be set is transmitted simultaneously with the transmission of a manipulated variable upper limit value OH1 and/or a manipulated variable lower limit value OL1 that is to be set, from a higher-level device, the specified time that has been transmitted is stored, as a new specified time TR, in the specified time storing portion of the controlling device, thus enabling a specified time TR that is matched to the manipulated variable upper limit value OH1 and/or a manipulated variable lower limit value OL1 that is set temporarily to be specified as demanded by the circumstances from the higher-level device.

BRIEF DESCRIPTIONS OF THE DRAWINGS

DETAILED DESCRIPTION

Principle

Figure 1:
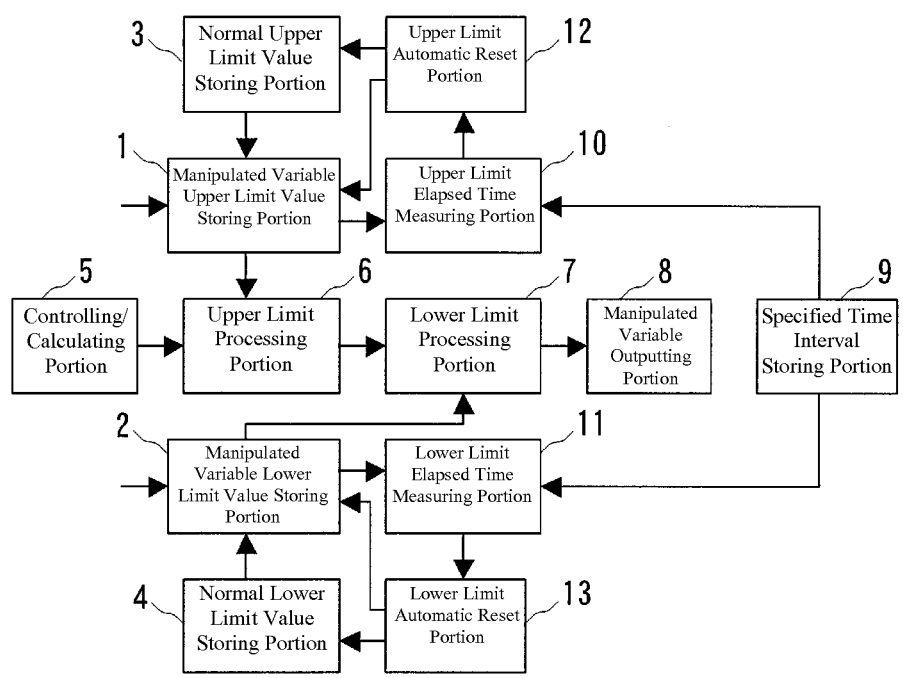
FIG. 1 is a block diagram illustrating a structure of a controlling device according to Example according to the present disclosure.

If a lower-level device (such as a controller, a temperature regulator, or the like) has the setting thereof updated from a higher-level device temporarily to a manipulated variable lower limit value OL or a manipulated variable upper limit value OH that is different from the normal value, through an algorithm of the higher-level device (a PC, or the like), then one may consider that the natural approach would be to have the operation for returning these values to the normal values be performed by the higher-level device as well. However, because one can envision the danger of the manipulated variable lower limit value OL or manipulated variable upper limit value OH not being returned to the normal value, due to a fault in a communication function, or the like, the operation from the higher-level side will become impossible.

Given this, a structure that, for a manipulated variable lower limit value OL or a manipulated variable upper limit value OH that is different from the normal value, a specified time (the specified time TR) is used to cause an automatic reset to the normal value assertively on the lower-level device is envisioned to return the manipulated variable lower limit value OL and/or the manipulated variable upper limit value OH reliably to the normal value. In this case, the normal values to which to return must be stored in the lower-level device, and the measurement of the specified time TR must also be performed in the lower-level device.

Note that even when a structure that causes the manipulated variable lower limit value OL and/or the manipulated variable upper limit value OH to fall back automatically to the normal value is used in the lower-level device, a configuration may be used to enable the manipulated variable lower limit value OL or the manipulated variable upper limit value OH to be returned to the normal value through a signal from the higher-level device with a timing that is faster than that of the automatic reset. The concept is that of the automatic reset function in the lower-level device being a backup function for returning the manipulated variable lower limit value OL and/or the manipulated variable upper limit value OH to the normal value, essentially providing redundancy.

Another Principle

Preferably historic updating times are referenced in order to set the appropriate specified time TR automatically. Methods that can be considered for the method for setting the specified time TR include, for example, methods wherein a real-number multiple of the average time interval, or a real-number multiple of the maximum time interval, for the actual updating cycles in the past is used as the specified time TR. In this case, the accumulation of past data, and the calculation and updating of the specified time TR need not necessarily be performed by the lower-level device. If the specified time TR that is set in the lower-level device in advance is roughly appropriate, then calculating and updating the specified time TR based on actual results will lack immediacy.

Yet Another Principle 3

The specified time TR, described above, is sent simultaneously, from the higher-level device to the lower-level device, with the manipulated variable lower limit value OL and/or the manipulated variable upper limit value OH, where the manipulated variable lower limit value OL and/or the manipulated variable upper limit value OH is set temporarily by the higher-level device. For example, if 20% is set as the manipulated variable upper limit value OH, that a specified time TR of at most 10 seconds is sent to the lower-level device. Doing this makes it possible for the specified time TR, matching the manipulated variable lower limit value OL and the manipulated variable upper limit value OH that is set temporarily, to always be specified as required by the circumstances. Note that even when the specified time TR is set by the higher-level device, still the normal values to which to return the manipulated variable lower limit value OL and the manipulated variable upper limit value OH must be stored in the lower-level device, and the measurement of the specified time TR must also be performed by the lower-level device.

Example

Forms for carrying out the present disclosure will be explained below in reference to the figures. The present example corresponds to Principle 1 of the Invention. FIG. 1 is a block diagram illustrating a structure of a controlling device according to the present example. The controlling device according to the present example includes: a manipulated variable upper limit value storing portion 1 that stores a manipulated variable upper limit value OH1, which may be set arbitrarily through communication; a manipulated variable lower limit value storing portion 2 that stores a manipulated variable lower limit value OL1, which may be set arbitrarily through communication; a normal upper limit value storing portion 3 that stores a manipulated variable upper limit value OH2 that is a normal value for the manipulated variable upper limit value OH1; a normal lower limit value storing portion 4 that stores a manipulated variable lower limit value OL2 that is a normal value for the manipulated variable lower limit value OL1; a controlling/calculating portion 5 that calculates a manipulated variable MV; an upper limit processing portion 6 that performs an upper limit limiting process for limiting the manipulated variable MV, calculated by the controlling/calculating portion 5, to no more than the manipulated variable upper limit value OH1; a lower limit processing portion 7 that performs a lower limit limiting process for limiting the manipulated variable MV, calculated by the controlling/calculating portion 5, to no less than the manipulated variable lower limit value OL1; a manipulated variable outputting portion 8 that outputs, to the control subject, a manipulated variable MV that has been subjected to the limiting processes by the upper limit processing portion 6 and the lower limit processing portion 7; a specified time storing portion 9 that stores the specified time TR; an upper limit elapsed time measuring portion 10 that measures an elapsed time TH after the manipulated variable upper limit value OH1 of the manipulated variable upper limit value storing portion 1 has been updated by communication from the higher-level device; a lower limit elapsed time measuring portion 11 that measures an elapsed time TL after the manipulated variable lower limit value OL1 of the manipulated variable lower limit value storing portion 2 has been updated by communication from the higher-level device; an upper limit automatic reset portion 12 that stores, in the manipulated variable upper limit value storing portion 1, as a new manipulated variable upper limit value OH1, the manipulated variable upper limit value OH2 that is stored in the normal upper limit value storing portion 3 when the elapsed time TH has arrived at the specified time TR; and a lower limit automatic reset portion 13 that stores, in the manipulated variable lower limit value storing portion 2, as a new manipulated variable lower limit value OL1, the manipulated variable lower limit value OL2 that is stored in the normal lower limit storing portion 4 when the elapsed time TL has arrived at the specified time TR. This controlling device is embodied through a controller or a temperature regulator.

The operation of the controlling device according to the present example will be explained next using FIG. 2. In the default state, the manipulated variable upper limit value OH2 (the normal value) that is stored in the normal upper limit value storing portion 3 is set as the manipulated variable upper limit value OH1 that is stored in the manipulated variable upper limit value storing portion 1. For example, if OH2=100%, then OH1 is set to 100%. Similarly, in the default state, the manipulated variable lower limit value OL2 (the normal value) that is stored in the normal lower limit value storing portion 4 is set as the manipulated variable lower limit value OL1 that is stored in the manipulated variable lower limit value storing portion 2. For example, if OL2=0%, then OL1 is set to 0%.

Figure 2:
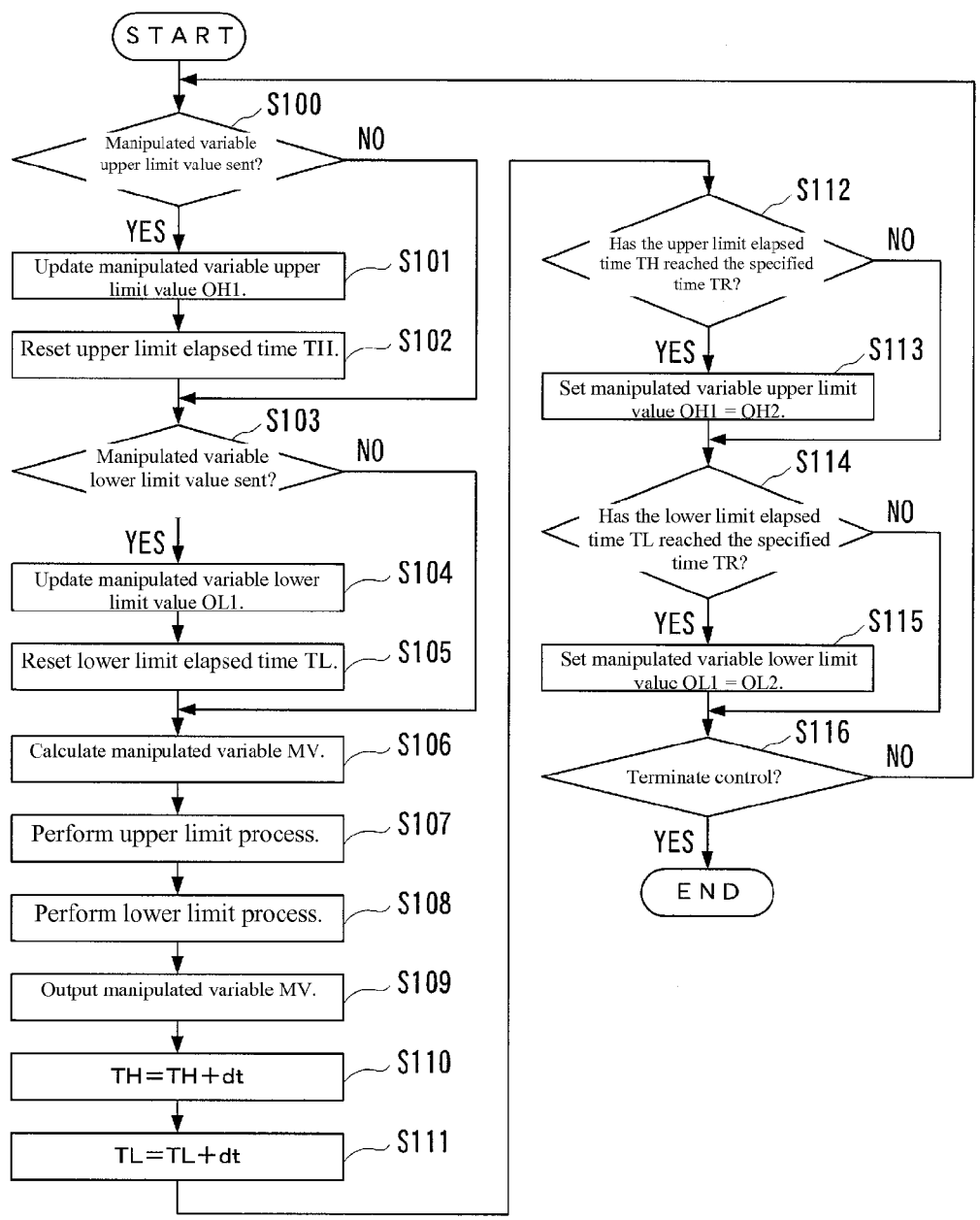
FIG. 2 is a flowchart for explaining the controlling device according to the Example according to the present disclosure.

When a manipulated variable upper limit value that is to be set is sent through a communication function from the higher-level device (a PC, or the like), not shown (YES in Step S100 in FIG. 2), then the manipulated variable upper limit value storing portion 1 stores, as a new manipulated variable upper limit value OH1, the manipulated variable upper limit value that has been set (Step S101 in FIG. 2), and the upper limit elapsed time measuring portion 10 resets the elapsed time TH to 0 (Step S102 in FIG. 2). If, for example, the manipulated variable upper limit value is changed to 60%, then the setting for OH1 is updated to 60%. Note that if, at the point in time that is one control interval earlier, OH1 was set to 60% through communication so that the same OH1=60% is set through communication, this is defined as an updated setting, and the elapsed time TH is reset to 0.

Moreover, when a manipulated variable lower limit value that is to be set is sent through a communication function from the higher-level device (YES in Step S103 in FIG. 2), then the manipulated variable lower limit value storing portion 2 stores, as a new manipulated variable lower limit value OL1, the manipulated variable lower limit value that has been set (Step S104 in FIG. 2), and the lower limit elapsed time measuring portion 11 resets the elapsed time TL to 0 (Step S105 in FIG. 2). If, for example, the manipulated variable lower limit value is changed to 40%, then the setting for OL1 is updated to 40%. Note that if, at the point in time that is one control interval earlier, OL1 was set to 40% through communication so that the same OL1=40% is set through communication, this is defined as an updated setting, and the elapsed time TL is reset to 0.

Following this, the controlling/calculating portion 5 calculates a manipulated variable MV through a PID control calculation, such as the following transfer function equation (Step S106 in FIG. 2):

$$MV = (100/Pb)\{1+(1/Tis)+Tds\}(SP-PV) \quad (1)$$

In Equation (1), SP is a setting value (a temperature setting value, for the case wherein the controlling device is applied to a heating device), PV is a process variable (a temperature measurement value for a case wherein the controlling device is applied to a heating device), Pb is a proportional band that is set in advance, Ti is an integrating time that is set in advance, Td is a differentiating time that is set in advance, and s is the Laplace operator.

The upper limit processing portion 6 performs an upper limit limiting process to limit the manipulated variable MV, calculated by the controlling/calculating portion 5, to a value that is no greater than the manipulated variable upper limit value OH1 that is stored in the manipulated variable upper limit storing portion 1 (Step S107 in FIG. 2).

$$\text{IF } MV > OH1 \text{ THEN } MV = OH1 \quad (2)$$

That is, if the manipulated variable MV is greater than the manipulated variable upper limit value OH1, the upper limit processing portion 6 sets the manipulated variable MV=OH1. For example, if MV=80% is calculated and OH1=100%, then it is left as MV=80%. If MV=80% is calculated and OH1=60%, then it is set to MV=60%.

The lower limit processing portion 7 performs a lower limit limiting process to limit the manipulated variable MV, which has been calculated by the controlling/calculating portion 5 and subjected to the upper limit limiting process by the upper limit processing portion 6, to a value that is no less than the manipulated variable lower limit value OL1 that is stored in the manipulated variable lower limit value storing portion 2 (Step S108 in FIG. 2).

$$\text{IF } MV < OL1 \text{ THEN } MV = OL1 \quad (3)$$

That is, if the manipulated variable MV is less than the manipulated variable lower limit value OL1, then the lower limit processing portion 7 sets the manipulated variable MV=OL1. For example, if MV=20% is calculated and OL1=0%, then it is left as MV=20%. If MV=20% is calculated and OL1=40%, then it is set to MV=40%.

The manipulated variable outputting portion 8 outputs, to the control subject (the electric power regulator 103, if the controlling device is applied to a heating device), the manipulated variable MV that has been subjected to the upper and lower limit limiting processes (Step S109 in FIG. 2). Following this, the upper limit elapsed time measuring portion 10 adds the control interval dt to the current elapsed time TH, to update the elapsed time TH (Step S110 in FIG. 2):

$$TH = TH + dt \quad (4)$$

The elapsed time TH after the updating of the manipulated variable upper limit value OH1 of the manipulated variable upper limit value storing portion 1 can be measured through this adding procedure.

Following this, the lower limit elapsed time measuring portion 11 adds the control interval dt to the current elapsed time TL, to update the elapsed time TL (Step S111 in FIG. 2):

$$TL = TL + dt \quad (5)$$

The elapsed time TL after the updating of the manipulated variable lower limit value OL1 of the manipulated variable lower limit value storing portion 2 can be measured through this adding procedure.

The upper limit automatic reset portion 12 evaluates whether or not the elapsed time TH has reached the specified time TR (Step S112 in FIG. 2), and if the elapsed time TH has arrived at the specified time TR (YES in Step S112), then the manipulated variable upper limit value OH2 that is stored in the normal upper limit value storing portion 3 is stored into the manipulated variable upper limit value storing portion 1 as the new manipulated variable upper limit value OH1 (Step S113 in FIG. 2). Doing this causes the manipulated variable upper limit value OH1 to reset to the manipulated variable upper limit value OH2 (the normal value). For example, if OH2=100%, then OH1 falls back to 100%.

The lower limit automatic reset portion 13 evaluates whether or not the elapsed time TL has reached the specified time TR (Step S114 in FIG. 2), and if the elapsed time TL has arrived at the specified time TR (YES in Step S114), then the manipulated variable lower limit value OL2 that is stored in the normal lower limit value storing portion 4 is stored into the manipulated variable lower limit value storing portion 2 as the new manipulated variable upper limit value OL1 (Step S115 in FIG. 2). Doing this causes the manipulated variable lower limit value OL1 to reset to the manipulated variable lower limit value OL2 (the normal value). For example, if OL2=0%, then OL1 falls back to 0%.

The processes in Step S100 through S115 as described above are repeated at each control interval dt until the control is terminated through, for example, an instruction from an operator (YES in Step S116 in FIG. 2).

The present example enables an automatic reset of the manipulated variable lower limit value OL and/or the manipulated variable upper limit value OH to the normal value, with a specified time interval TR, even in a case wherein, due to the occurrence of a fault in the communication function, it is not possible for the manipulated variable lower limit value OL or the manipulated variable upper limit value OH to be returned, by the higher-level device, to the normal value in a structure wherein a specialized processing technology for manipulating the settings for the manipulated variable lower limit value OL or the manipulated variable upper limit value OH, used by a controlling device, through a communication function between a higher-level device (such as a PC, or the like) and a controlling device on a lower level. That is, this makes it possible to mitigate problems that occur due to the manipulated variable lower limit value OL or the manipulated variable upper limit value OH being locked in to a value that is different from the normal value over an extended period of time.

Note that the specified time TR may be set to a common value for both the manipulated variable lower limit value OL and the manipulated variable upper limit value OH, or the specified time TR that is used for the manipulated variable lower limit value OL (the specified time TR used in the evaluation in Step S114), and the specified time TR used for the manipulated variable upper limit value OH (the specified time TR used in the evaluation in Step S112) may be set to different values.

Figure 3:
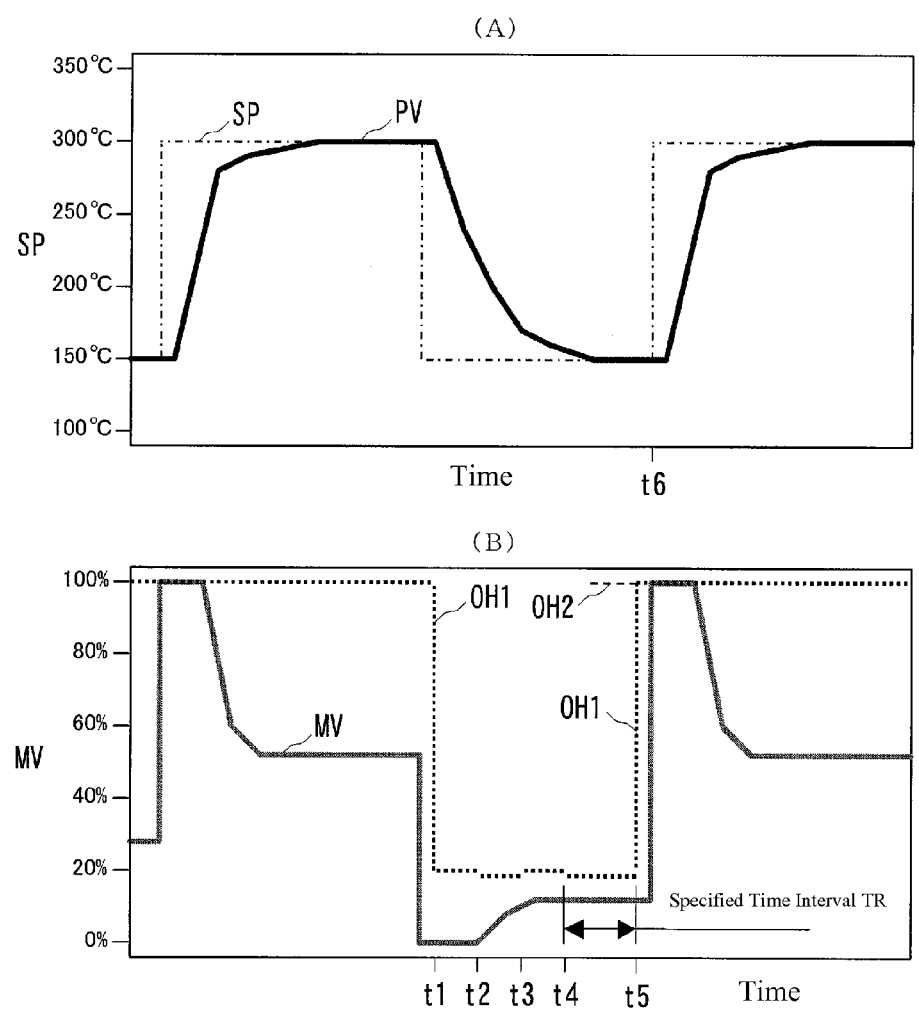
FIG. 3 is a diagram for explaining the operation of the controlling device according to the Example according to the present disclosure.

FIG. 3 (A) and FIG. 3 (B) are diagrams for explaining the operation of the controlling device according to the present example, where FIG. 3 (A) illustrates changes in the process variable PV, and FIG. 3 (B) illustrates changes in the manipulated variable MV. Here let us assume that, for convenience in, for example, the distribution of electric power, the manipulated variable upper limit value OH1 is changed, temporarily, from 100% to 20% at a time t1 by a value sent from a higher level device for a controlling device wherein there is no call for increasing the temperature (that is, for a temperature regulator wherein the temperature setting value SP has been changed from 300° C. to 150° C., as shown in FIG. 3 (A)).

Similarly, at the respective times t2, t3, and t4, the manipulated variable upper limit value OH1 is changed, by a value sent from the higher-level device, to a value near 20%. Each time the manipulated variable upper limit value OH1 is updated, as described above, the elapsed time TH measured by the upper limit elapsed time measuring portion 10 is reset to 0. In the interval between times t1 and t2, the interval between times t2 and t3, and the interval between times t3 and t4, the specified time TR is not satisfied. After the manipulated variable upper limit value OH1 is updated at time t4, the elapsed time TH reaches the specified time TR at time t5, without being updated again, and so the upper limit automatic reset portion 12 causes the manipulated variable upper limit value OH1 to reset to the manipulated variable upper limit value OH2 (the normal value). Thereafter, at time t6, the temperature setting value SP is changed from 150° C. to 300° C., and when the temperature begins to rise, the manipulated variable upper limit value OH1 falls back to OH2=100%, and thus the situation wherein the heating capability is inadequate will not occur, enabling heating to be performed properly.

Another Example

Figure 4:
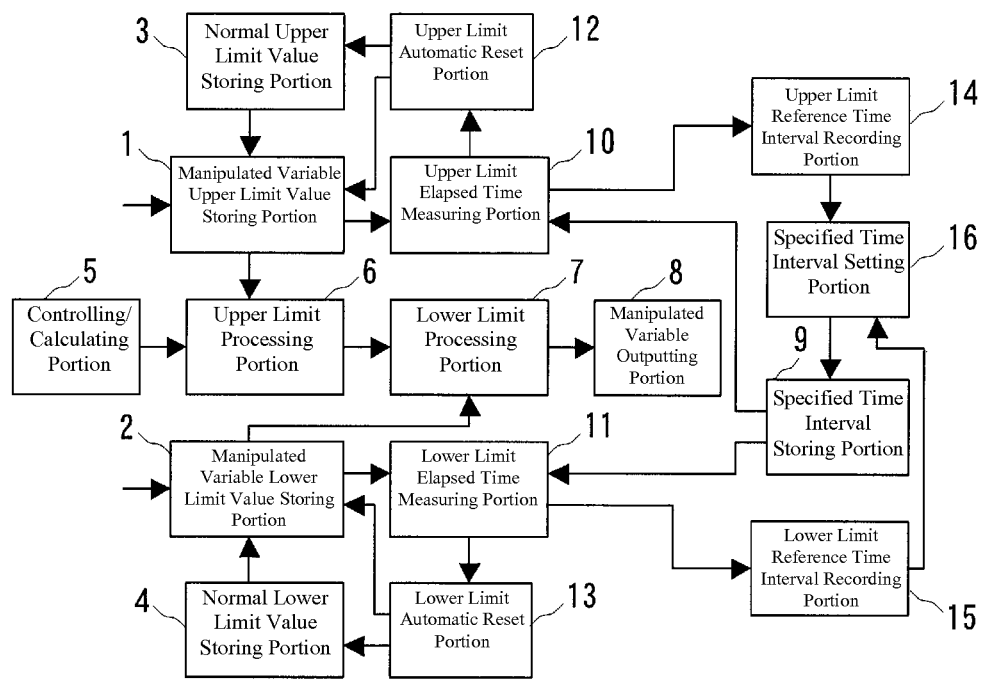
FIG. 4 is a block diagram illustrating a structure of a controlling device according to Another Example according to the present disclosure.

Another Example according to the present disclosure will be explained next. In the present example, a structure corresponding to Principle 2 of the Invention is added to the Example. FIG. 4 is a block diagram illustrating a structure of a controlling device according to the present example, where structures identical to those of FIG. 1 are assigned identical codes. The controlling device according to the present example includes: a manipulated variable upper limit value storing portion 1, a manipulated variable lower limit value storing portion 2, a normal upper limit value storing portion 3, a normal lower limit value storing portion 4, a controlling/calculating portion 5, an upper limit processing portion 6, a lower limit processing portion 7, a manipulated variable outputting portion 8, a specified time interval storing portion 9, an upper limit elapsed time measuring portion 10, a lower limit elapsed time measuring portion 11, an upper limit automatic reset portion 12, a lower limit automatic reset portion 13, an upper limit reference time interval recording portion 14 that records a reference time interval THm based on the elapsed time TH when the manipulated variable upper limit value OH1 has been updated through a communication prior to the elapsed time TH arriving at the specified time interval TR, a lower limit reference time interval recording portion 15 that records a reference time interval TLm based on the elapsed time TL when the manipulated variable lower limit value OL1 has been updated through a communication prior to the elapsed time TL arriving at the specified time interval TR, and a specified time interval setting portion 16 that stores, in the specified time interval storing portion 9, as a new specified time interval TR, a time interval that is 1.5 times the reference time interval THm or the reference time interval TLm, whichever is longer. Moreover, in the initial state, a time interval that is anticipated to be adequately long is set as the specified time interval TR that is stored in the specified time interval storing portion 9.

The operation of the controlling device according to the present example will be explained next using FIG. 5. As with the Example, in the default state, the manipulated variable upper limit value OH2 (the normal value) that is stored in the normal upper limit value storing portion 3 is set as the manipulated variable upper limit value OH1 that is stored in the manipulated variable upper limit value storing portion 1.

Moreover, in the default state, the manipulated variable lower limit value OL2 (the normal value) that is stored in the normal lower limit value storing portion 4 is set as the manipulated variable lower limit value OL1 that is stored in the manipulated variable lower limit value storing portion 2.

Moreover, in the default state, a time interval that is anticipated to be adequately long is set as the specified time interval TR in the specified time interval storing portion 9. For example, TR is set to 60 seconds. Moreover, 0 is set as the reference time interval THm that is stored in the upper limit reference time interval recording portion 14. Similarly, 0 is set as the reference time interval TLm that is stored in the lower limit reference time interval recording portion 15.

Figure 5:
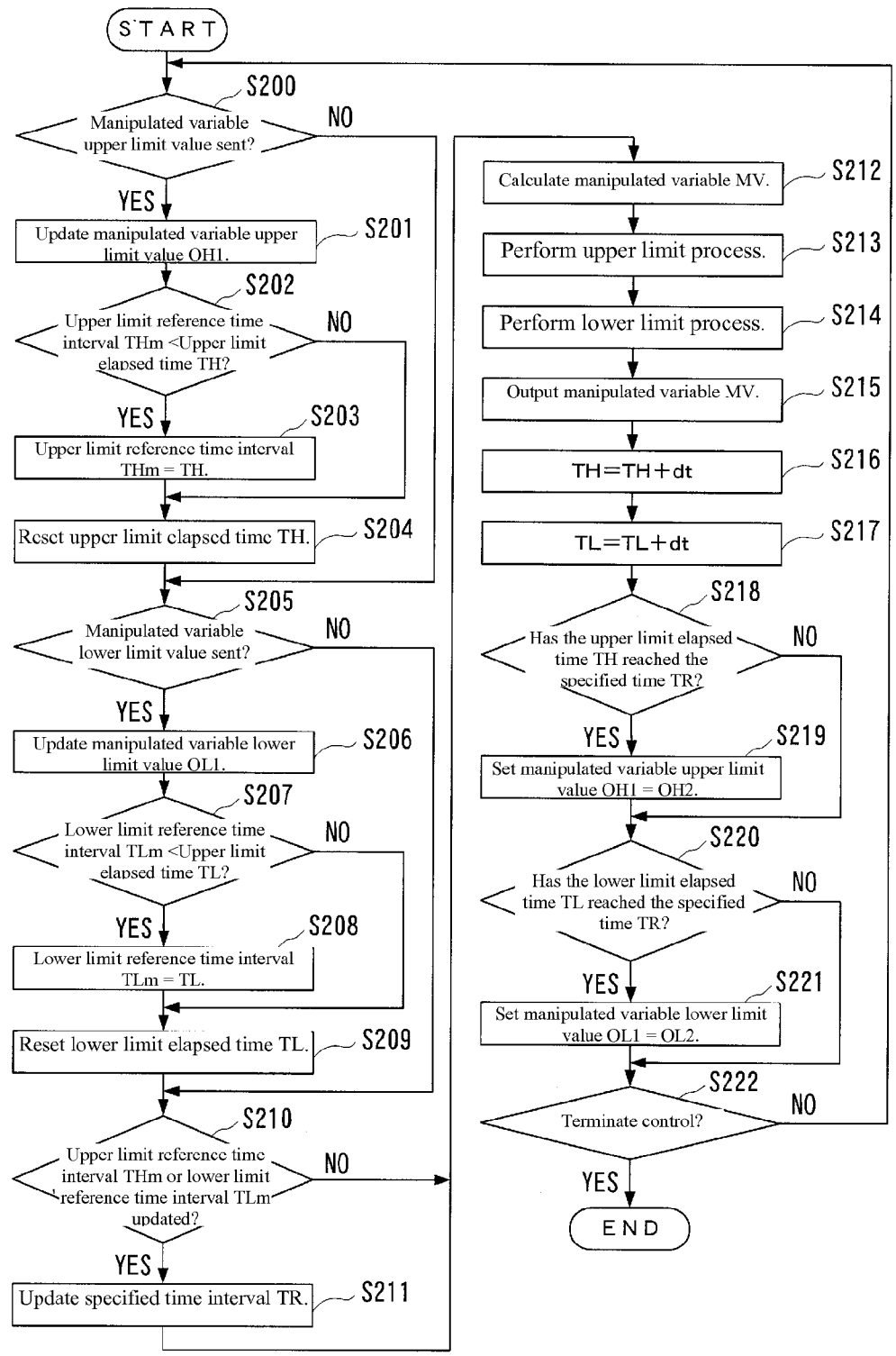
FIG. 5 is a flowchart for explaining the controlling device according to the Another Example according to the present disclosure.

The procedures in Step S200 and S201 in FIG. 5 are identical to the respective Step S100 and S101 in FIG. 2, so explanations thereof will be omitted. When the manipulated variable upper limit value OH1 of the manipulated variable upper limit value storing portion 1 is updated before the elapsed time TH has arrived at the specified time interval TR, then if the current elapsed time TH is longer than the reference time interval THm that is stored in the upper limit reference time interval recording portion 14 (YES in Step S202 in FIG. 5), then the upper limit reference time interval recording portion 14 records this elapsed time TH as a new reference time interval THm (Step S203 in FIG. 5). For example, THm=10 seconds may be recorded as an actual result. Given this, the upper limit elapsed time measuring portion 10 resets the elapsed time TH to 0 (Step S204) in FIG. 5).

The procedures in Step S205 and S206 in FIG. 5 are identical to the respective Step S104 and S104 in FIG. 2, so explanations thereof will be omitted. When the manipulated variable lower limit value OL1 of the manipulated variable lower limit value storing portion 2 is updated before the elapsed time TL has arrived at the specified time interval TR, then if the current elapsed time TL is longer than the reference time interval TLm that is stored in the lower limit reference time interval recording portion 15 (YES in Step S207 in FIG. 5), then the lower limit reference time interval recording portion 15 records this elapsed time TL as a new reference time interval TLm (Step S208 in FIG. 5). For example, TLm=12 seconds may be recorded as an actual result. Given this, the lower limit elapsed time measuring portion 11 resets the elapsed time TL to 0 (Step S209) in FIG. 5).

When the reference time interval THm and/or the reference time interval TLm has been updated to a value other than the default value of 0 (YES in Step S210 in FIG. 5), then the specified time interval setting portion 16 stores, as a new specified time interval TR in the specified time interval storing portion 9, a time interval that is a real-number multiple (for example, 1.5 times) the length of the reference time interval THm or the reference time interval TLm, whichever is longer (Step S211 in FIG. 5). For example, if, as described above, THm has been updated to 10 seconds, and TLm has been updated to 12 seconds, then 18 seconds, which is the time interval that is 1.5 times TLm=12 seconds is set as the new specified time interval TR.

The procedures in Step S212, S213, S213, S215, S216, S217, S218, S219, S220, and S221 in FIG. 5 are identical to the respective Step S106, S107, S108, S109, S110, S111, S112, S113, S114, and S115 in FIG. 2, so explanations thereof will be omitted. The processes in Step S200 through S221 as described above are repeated at each control interval dt until the control is terminated through, for example, an instruction from an operator (YES in Step S222 in FIG. 5).

In this way, in the present example, the specified time interval TR that is stored in the lower-level controlling device can be set to an appropriate value. Note that while, in the present example, the longest time interval of the time intervals TH that have been measured in the past is set as the reference time interval THm that is recorded in the upper limit reference time interval recording portion 14, there is no limitation thereto, but rather a time interval that is the average of the elapsed times TH that have been measured in the past may be recorded as the reference time interval THm, or another time interval that can serve as a reference may be recorded. Similarly, while, in the present example, the longest time interval of the time intervals TL that have been measured in the past is set as the reference time interval TLm that is recorded in the lower limit reference time interval recording portion 15, there is no limitation thereto, but rather a time interval that is the average of the elapsed times TL that have been measured in the past may be recorded as the reference time interval TLm, or another time interval that can serve as a reference may be recorded.

Moreover, while, in the present example, a time interval that is a real-number multiple of the reference time interval THm or the reference time interval TLm, whichever is longer, is used as the new specified time interval TR, there is no limitation thereto, but rather a time interval that is the average of the reference time interval THm and the reference time interval TLm may be set as the new specified time interval TR, or another time interval that can be used as a reference may be set as the specified time interval TR.

Yet Another Example

Figure 6:
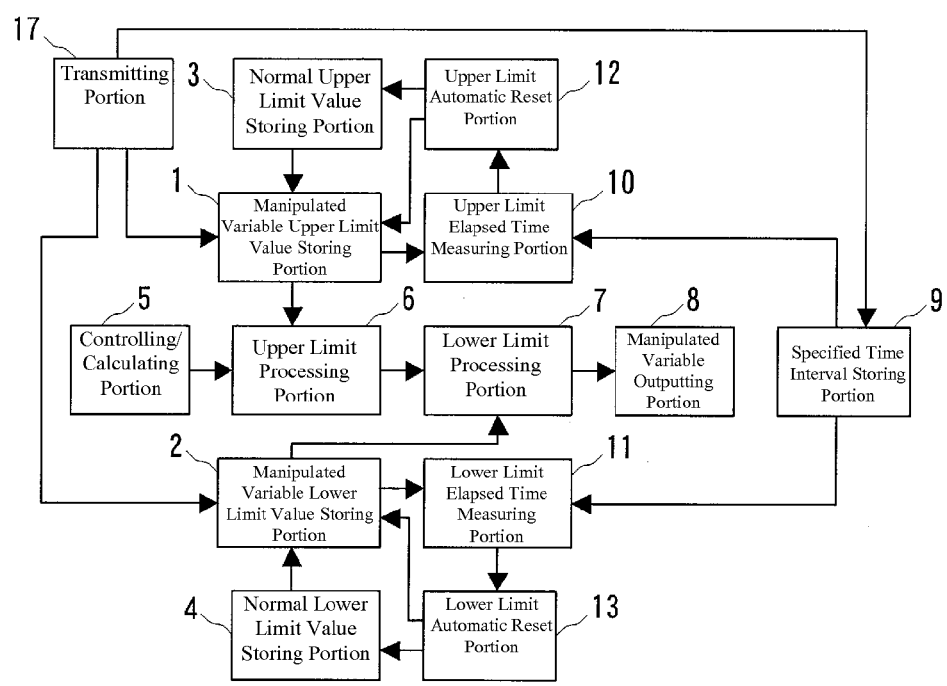
FIG. 6 is a block diagram illustrating a structure of a controlling device according to Yet Another Example according to the present disclosure.

Yet Another Example according to the present disclosure will be explained next. In the present example, a structure corresponding to Principle 3 of the Invention is added to the Example. FIG. 6 is a block diagram illustrating a structure of a controlling device according to the present example, where structures identical to those of FIG. 1 are assigned identical codes. The controlling device according to the present example includes: a manipulated variable upper limit value storing portion 1, a manipulated variable lower limit value storing portion 2, a normal upper limit value storing portion 3, a normal lower limit value storing portion 4, a controlling/calculating portion 5, an upper limit processing portion 6, a lower limit processing portion 7, a manipulated variable outputting portion 8, a specified time interval storing portion 9, an upper limit elapsed time measuring portion 10, a lower limit elapsed time measuring portion 11, an upper limit automatic reset portion 12, and a lower limit automatic reset portion 13. Moreover, in the initial state, a time interval that is anticipated to be adequately long is set as the specified time interval TR that is stored in the specified time interval storing portion 9.

The operation of the controlling device according to the present example will be explained next using FIG. 7. As with the Example, in the default state, the manipulated variable upper limit value OH2 (the normal value) that is stored in the normal upper limit value storing portion 3 is set as the manipulated variable upper limit value OH1 that is stored in the manipulated variable upper limit value storing portion 1. Moreover, in the default state, the manipulated variable lower limit value OL2 (the normal value) that is stored in the normal lower limit value storing portion 4 is set as the manipulated variable lower limit value OL1 that is stored in the manipulated variable lower limit value storing portion 2.

Figure 7:
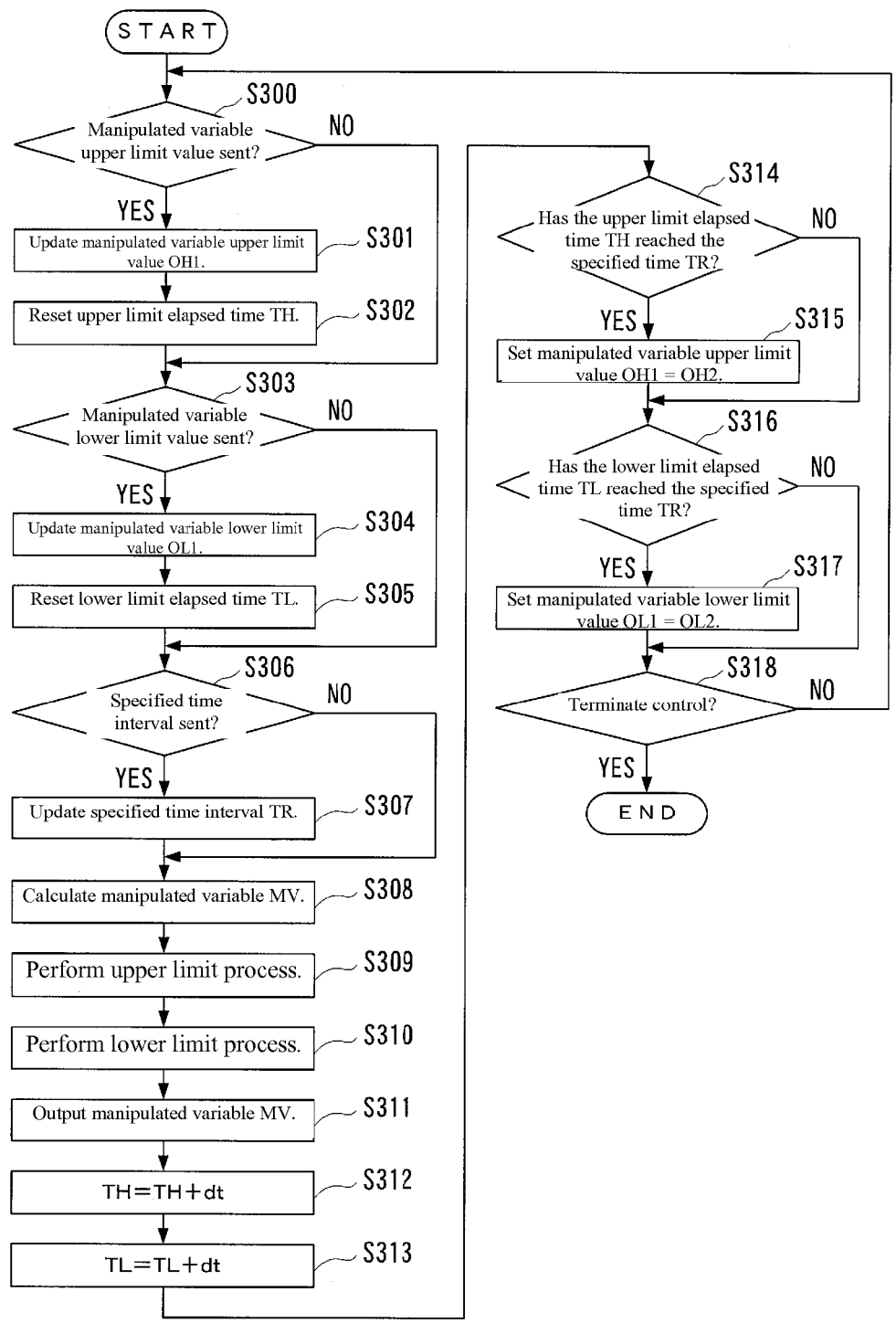
FIG. 7 is a flowchart for explaining the controlling device according to the Yet Another Example according to the present disclosure.
Figure 8:
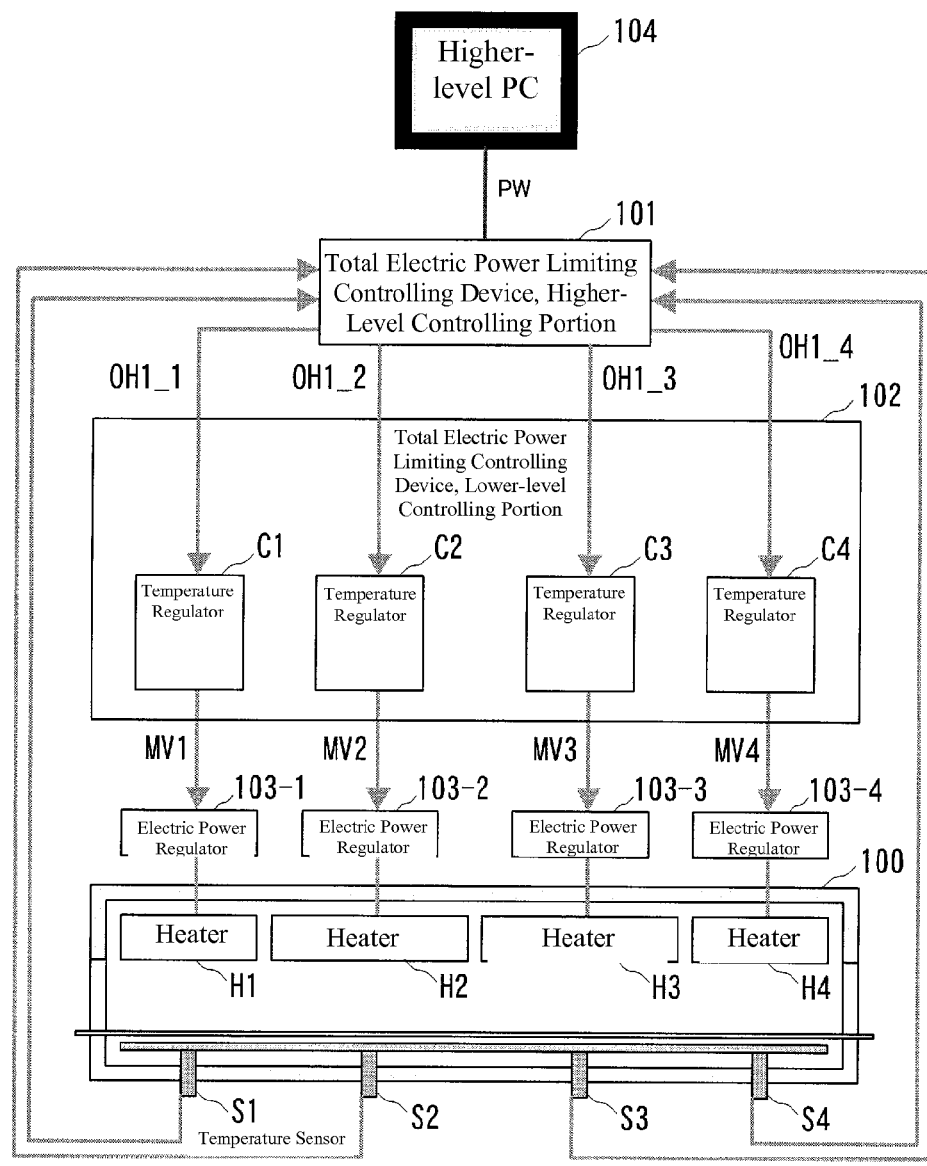
FIG. 8 is a block diagram illustrating a configuration of a heating device that is provided with a plurality of electric heaters.
Figure 9:
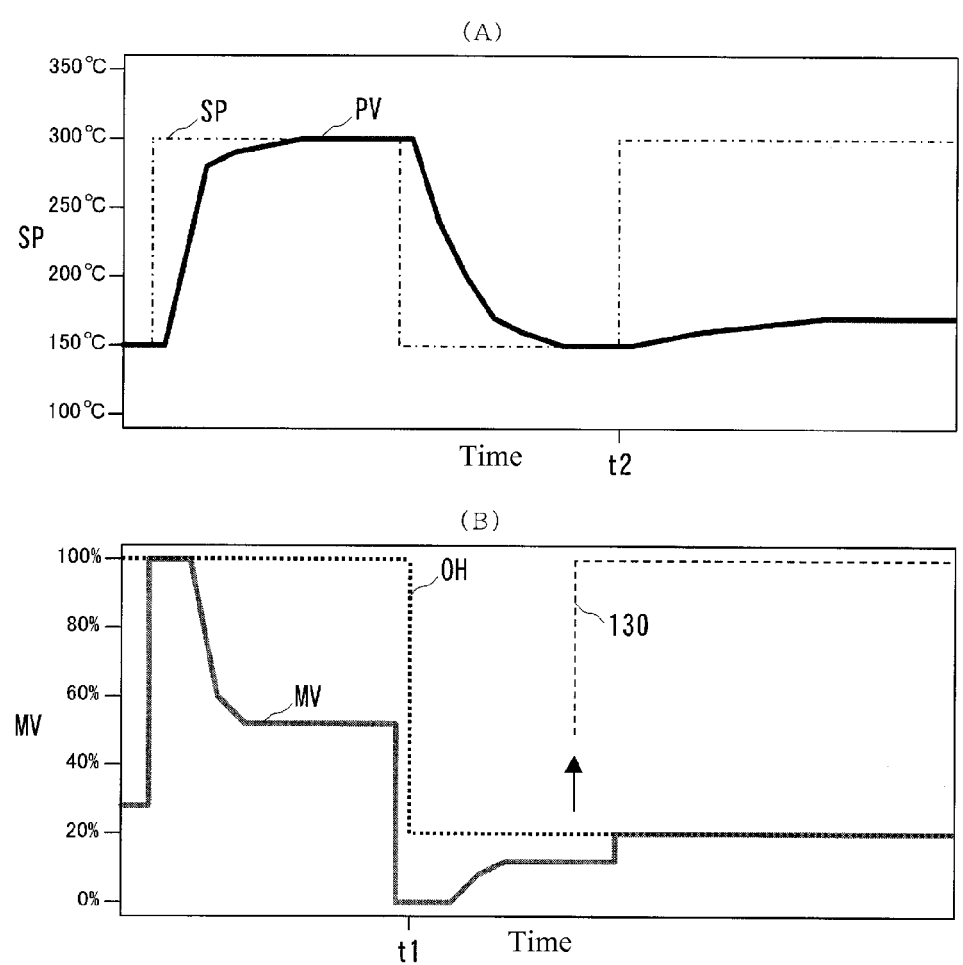
FIG. 9 is a diagram for explaining the problems of the manipulated variable upper limit value being locked in unexpectedly.
Figure 10:
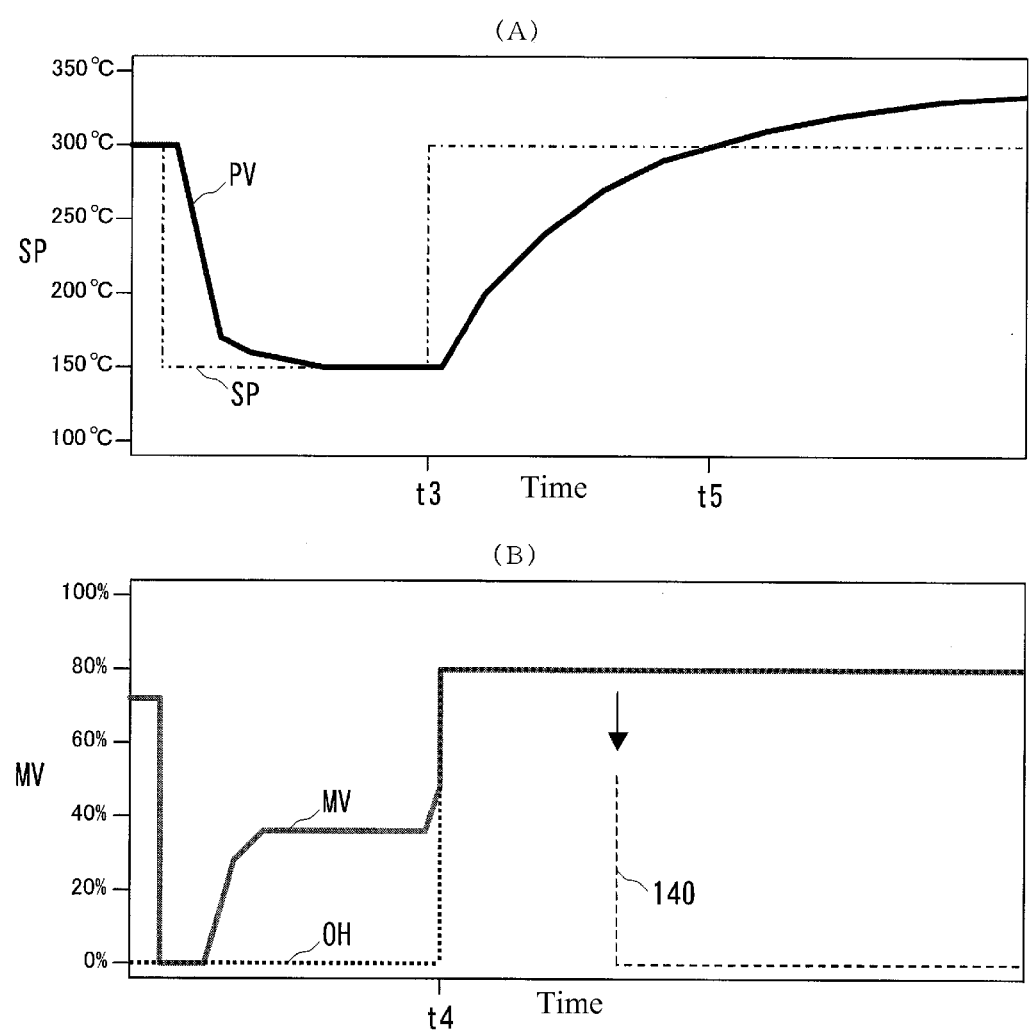
FIG. 10 is a diagram for explaining the problems in the manipulated variable lower limit value being locked in unexpectedly.

The procedures in S300, S301, S302, S303, S304, and S305 in FIG. 7 are identical to the respective S100, S101, S102, S103, S104, and S105 in FIG. 2, so explanations thereof will be omitted. In the present example, a transmitting portion 17 of the higher-level device (a PC, or the like) is configured so as to be able to send the specified time interval that is to be set, simultaneously with sending the manipulated variable upper limit value and the manipulated variable lower limit value that are to be set. The specified time interval TR that is stored in the specified time interval storing portion 9 can be set arbitrarily, through communication, in response thereto.

That is, when a specified time interval that is to be set is sent through a communication function from the transmitting portion 17 of the higher-level device, simultaneously with the transmission of the manipulated variable upper limit value and/or the manipulated variable lower limit value (YES in Step S306 in FIG. 7), the specified time interval storing portion 9 stores, as a new specified time interval TR, the specified time interval that has been transmitted (Step S307 in FIG. 7)

The procedures in Step S308, S309, S310, S311, S312, S313, S314, S315, S316, and S317 in FIG. 7 are identical to the respective Step S106, S107, S108, S109, S110, S111, S112, S113, S114, and S115 in FIG. 2, so explanations thereof will be omitted.

The processes in Step S300 through S317 as described above are repeated at each control interval dt until the control is terminated through, for example, an instruction from an operator (YES in Step S318 in FIG. 7). In this way, in the present example the specified time interval TR that is matched to a manipulated variable lower limit value OL1 or a manipulated variable upper limit value OH1, which is set temporarily, may be specified, as required by the current circumstances, from the higher-level device.

Note that while, in the Example, Another Example and Yet Another Example, the setting operations for both the manipulated variable lower limit value OL1 and the manipulated variable upper limit value OH1 were performed by the higher-level device, instead, the configuration may be such that only one or the other setting operation is performed.

As a configuration that corresponds to the first and third operating principles, described above, if the setting operation is performed for only the manipulated variable upper limit value OH1, then the controlling device has a manipulated variable upper limit value storing portion 1 (manipulated variable limit value storing means) that stores the manipulated variable upper limit value OH1 (the first manipulated variable limit value), a normal upper limit value storing portion 3 (normal limit value storing means) that stores the manipulated variable upper limit value OH2 (the second manipulated variable limit value) that is the normal value for the manipulated variable upper limit value OH1, a controlling/calculating portion 5, an upper limit processing portion 6, a manipulated variable outputting portion 8, a specified time interval storing portion 9, an upper limit elapsed time measuring portion 10, and an upper limit automatic reset portion 12, at least, should be provided. Moreover, in a configuration that corresponds to the second principle of the invention, described above, the upper limit reference time interval recording portion 14 and the specified time interval setting portion 16 should be provided. In this case, the reference time interval THm will be the reference time interval TXm. At this time, there may or may not be a manipulated variable lower limit value storing portion 2 and a lower limit processing portion 7 in the controlling device.

As a configuration that corresponds to the first and third operating principles, described above, if the setting operation is performed for only the manipulated variable lower limit value OL1, then the controlling device has a manipulated variable lower limit value storing portion 2 (manipulated variable limit value storing means) that stores the manipulated variable lower limit value OL1 (the first manipulated variable limit value), a normal lower limit value storing portion 4 (normal limit value storing means) that stores the manipulated variable lower limit value OL2 (the second manipulated variable limit value) that is the normal value for the manipulated variable lower limit value OL1, a controlling/calculating portion 5, a lower limit processing portion 7, a manipulated variable outputting portion 8, a specified time interval storing portion 9, a lower limit elapsed time measuring portion 11, and a lower limit automatic reset portion 13, at least, should be provided. Moreover, in a configuration that corresponds to the second principle of the invention, described above, the lower limit reference time interval recording portion 15 and the specified time interval setting portion 16 should be provided. In this case, the reference time interval TLm will be the reference time interval TXm. At this time, there may or may not be a manipulated variable upper limit value storing portion 1 and an upper limit processing portion 6 in the controlling device.

The controlling device explained in the Example, Another Example and Yet Another Example can be embodied through a computer that is provided with a CPU (Central Processing Unit), a memory device, and an interface, and a program for controlling these hardware resources. The CPU executes the processes explained in the Example, Another Example and Yet Another Example in accordance with a program that is stored in the memory device.

Note that while in the total electric power limiting control disclosed in the JP '533 an operation is performed for setting the manipulated variable upper limit value for the lower-level device from the higher-level device, as described above, the present invention is not limited to an operation for setting the manipulated variable upper limit value, but rather made be applied to a case of an operation for setting only the manipulated variable lower limit value, or may be applied also to a case of an operation for setting both the manipulated variable lower limit value and the manipulated variable upper limit value. Furthermore, there are a variety of purposes for which a manipulated variable lower limit value and a manipulated variable upper limit value of a lower-level device may be set by a higher-level device, and a variety of methods may also be considered as the methods by which the manipulated variable lower limit value and the manipulated variable upper limit value are determined by the higher-level device. The present invention relates to the lower level controlling device, and does not control the method by which the manipulated variable lower limit value or manipulated variable upper limit value is determined in the higher level device. That is, the structure in the higher-level device for determining the manipulated variable lower limit value and/or the manipulated variable upper limit value is not an essential structural element of the present invention.

The present invention can be applied to a control system wherein a control solution for a setting operation for a manipulated variable upper limit value and/or a manipulated variable lower-limit value is executed by the higher-level device.

The invention claimed is:
1. A controlling device comprising:
a manipulated variable limit value memory that stores a first manipulated variable limit value that is one of a manipulated variable lower limit value or a manipulated variable upper limit value that can be set arbitrarily through communication;
a normal limit value memory that stores a second manipulated variable limit value that is a normal value for the first manipulated variable limit value;
a processor that calculates a manipulated variable (MV);
the processor performs at least one of an upper limit limiting process limiting the manipulated variable (MV) to a value that is no more than a manipulated variable upper limit value indicated by the first manipulated variable limit value, the manipulated variable (MV), calculated by the processor, and a lower limit limiting process limiting, to a value that is no less than a manipulated variable lower limit value that is indicated by the first manipulated variable limit value;
a signal output outputs to the control subject the manipulated variable MV that has been subjected to the limiting process;
a specified time interval memory that stores a specified time interval (TR), wherein the specified time interval memory stores, as a new specified time interval (TR), a specified time interval that has been transmitted, when a specified time interval to be set is transmitted simultaneously with the transmission of a first manipulated variable limit value that is to be set, from the higher-level device;
an elapsed time clock that measures time that has elapsed after the first manipulated variable limit value has been updated through communication from the higher-level device; and
an automatic reset that causes the second manipulated variable limit value, which is stored in the normal limit value memory, to be stored in the manipulated variable limit value memory as a new first manipulated variable limit value when the elapsed time reaches the specified time interval (TR),
wherein the signal output regulates an amount of electric power used by a lower-level device.

2. The controlling device as set forth in claim 1, further comprising:
a reference time interval memory that records a reference time interval (TXm) based on the elapsed time when the first manipulated variable limit value has been updated through communication prior to the elapsed time arriving at the specified time interval (TR); and
a specified time interval memory that stores, as a new specified time interval (TR) in the specified time interval storing portion, a time interval that is a real-number multiple of the reference time interval (TXm).

3. The controlling device as set forth in claim 2, wherein:
the reference time interval memory uses, as the reference time interval (TXm), a time interval that is the average of the elapsed times measured in the past, or use, as the reference time interval (TXm), a time interval that is the longest of the time elapsed intervals measured in the past.

4. A controlling device comprising:
a manipulated variable upper limit memory that stores a manipulated variable upper limit value (OH1) that can be set arbitrarily through communication;
a manipulated variable lower limit memory that stores a manipulated variable lower limit value (OL1) that can be set arbitrarily through communication;
a normal upper limit memory that stores a manipulated variable upper limit value (OH2) that is a normal value for the manipulated variable upper limit value (OH1);
a normal lower limit memory that stores a manipulated variable lower limit value (OL2) that is a normal value for the manipulated variable lower limit value (OL1);
a processor that calculates a manipulated variable (MV);
an upper limit processor that performs an upper limit limiting process to control a manipulated variable (MV), calculated by the processor, to a value that is no greater than the manipulated variable upper limit value (OH1);
a lower limit processor that performs a lower limit limiting process to control a manipulated variable (MV), calculated by the processor, to a value that is no less than the manipulated variable lower limit value (OL1);
a manipulated variable output that outputs to the control subject the manipulated variable MV that has been subjected to the upper and lower limit limiting processes;
a specified time interval memory that stores a specified time interval (TR) and the specified time interval memory stores, as a new specified time interval TR, a specified time interval that it has been transmitted, when a specified time interval to be set is transmitted simultaneously with the transmission of a first manipulated variable limit value that is to be set, from the higher-level device;
an upper limit elapsed time measuring portion that measures the upper limit elapsed time (TH) since updating of the manipulated variable upper limit value (OH1) through communication from the higher-level device;
a lower limit elapsed time clock that measures the lower limit elapsed time (TL) since updating of the manipulated variable lower limit value (OL1) through communication from the higher-level device;
an upper limit automatic memory that stores, as a new manipulated variable upper limit value (OH1), in the manipulated variable upper limit value memory, the manipulated variable upper limit value (OH2) that is stored in the normal upper limit value memory, when the elapsed time (TH) has arrived at the specified time interval (TR); and
a lower limit automatic memory that stores, as a new manipulated variable lower limit value (OL1), in the manipulated variable lower limit value memory, the manipulated variable lower limit value (OL2) that is stored in the normal lower limit value memory, when the elapsed time (TL) has arrived at the specified time interval TR,
wherein the controlling device regulates an amount of electric power used by a lower-level device.

5. The controlling device as set forth in claim 4, further comprising:
an upper limit reference time interval memory that records a reference time interval (THm) based on the elapsed time (TH) when the manipulated variable upper limit value (OH1) has been updated through communication prior to the elapsed time (TH) arriving at the specified time interval (TR);
a lower limit reference time interval memory that records a reference time interval (TLm) based on the elapsed time TL) when the manipulated variable lower limit value (OL1) has been updated through communication prior to the elapsed time (TL) arriving at the specified time interval (TR);
a specified time interval memory that stores, as a new specified time interval in the specified time interval memory, a time interval that is a real-number multiple of a value based on the reference time interval (THm) and (TLm).

6. The controlling device as set forth in claim 5, wherein:
the upper limit reference time interval memory uses, as the reference time interval (THm), a time interval that is the average of the elapsed times (TH) measured in the past, or use, as the reference time interval (THm), a time interval that is the longest of the elapsed times (TH) measured in the past;
the lower limit reference time interval memory uses, as the reference time interval (TLm), a time interval that is the average of the elapsed times (TL) measured in the past, or use, as the reference time interval (TLm), a time interval that is the longest of the elapsed times (TL) measured in the past; and
the specified time interval processor sets, as a new specified time interval (TR), a time interval that is a real-number multiple of the reference time interval (THm) or (TLm), whichever is longer, or sets, as a new specified time interval (TR) the average time interval of the reference time intervals (THm) and (TLm).

7. The controlling device as set forth in claim 4, wherein:
the specified time interval memory stores, as a new specified time interval (TR), at least one of a specified time interval that it has been transmitted, when a specified time interval to be set is transmitted simultaneously with the transmission of a manipulated variable upper limit value (OH1) and a manipulated variable lower limit value (OL1) that is to be set, from the higher-level device.

8. A method of controlling electric power consumption, comprising the steps of:
updating, through communication from a higher if in level device, a first manipulated variable limit value that is either a manipulated variable lower limit value or a manipulated variable upper limit value that is stored in a manipulated variable limit value storing portion;
calculating a manipulated variable (MV);
performing an upper limit limiting process limiting the manipulated variable (MV) to a value that is no more than a manipulated variable upper limit value indicated by the first manipulated variable limit value, the manipulated variable (MV) calculated by the calculating step, and/or a lower limit limiting process limiting, to a value that is no less than a manipulated variable lower limit value that is indicated by the first manipulated variable limit value;
outputting to the control subject the manipulated variable (MV) that has been subjected to the limiting process;
measuring time that has elapsed after the first manipulated variable limit value has been updated through communication from the higher-level device; and
causing the second manipulated variable limit value, which is stored in a normal limit value storing portion, to be stored in the manipulated variable limit value storing portion as a new first manipulated variable limit value when the elapsed time reaches the specified time interval (TR) stored in the specified time interval storing portion.

9. The controlling method as set forth in claim 8, further comprising the steps of:
recording a reference time interval (TXm) based on the elapsed time when the first manipulated variable limit value has been updated through communication prior to the elapsed time arriving at the specified time interval (TR); and storing, as a new specified time interval (TR) in the specified time interval storing portion, a time interval that is a real-number multiple of the reference time interval (TXm).

10. The controlling method as set forth in claim 9, wherein:
the recording step uses, as the reference time interval (TXm), a time interval that is the average of the elapsed times measured in the past, or uses, as the reference time interval (TXm), a time interval that is the longest of the elapsed times measured in the past.

11. The controlling method as set forth in claim 8, further comprising the step of:
storing, as a new specified time interval (TR), a specified time interval that it has been transmitted, when a specified time interval to be set is transmitted simultaneously with the transmission of a first manipulated variable limit value that is to be set, from the higher-level device.

12. A controlling method, comprising the steps of:
updating, through communication from a higher-level device, a manipulated variable upper limit value (OH1) that is stored in a manipulated variable upper limit storing portion;
updating, through communication from a higher-level device, a manipulated variable lower limit value (OL1) that is stored in a manipulated variable lower limit storing portion;
calculating a manipulated variable (MV);
performing an upper limit limiting process to control a manipulated variable (MV), calculated by the control calculating step, to a value that is no greater than the manipulated variable upper limit value (OH1);
performing a lower limit limiting process to control a manipulated variable (MV), calculated by the calculating step, to a value that is no less than the manipulated variable lower limit value (OL1);
outputting to the control subject the manipulated variable (MV) that has been subjected to the upper and lower limit limiting processes;
measuring the upper limit elapsed time (TH) since updating of the manipulated variable upper limit value (OH1) through communication from the higher-level device;
measuring the lower limit elapsed time (TL) since updating of the manipulated variable lower limit value (OL1) through communication from the higher-level device;
storing, as a new manipulated variable upper limit value (OH1), in the manipulated variable upper limit value storing portion, the manipulated variable upper limit value (OH2) that is stored in the normal upper limit value storing portion as a normal value for the manipulated variable upper limit value (OH1), when the elapsed time (TH) has arrived at the specified time interval (TR) stored in a specified time interval storing portion; and
storing, as a new manipulated variable lower limit value (OL1), in a manipulated variable lower limit value storing portion, the manipulated variable lower limit value (OL2) that is stored in the normal lower limit value storing portion as a normal value for the manipulated variable lower limit value (OL1), when the elapsed time (TL) has arrived at the specified time interval (TR).

13. The controlling method as set forth in claim 12, further comprising the steps of:

recording a reference time interval (THm) based on the elapsed time (TH) when the manipulated variable upper limit value (OH1) has been updated through communication prior to the elapsed time (TH) arriving at the specified time interval (TR);

recording a reference time interval (TLm) based on the elapsed time (TL) when the manipulated variable lower limit value (OL1) has been updated through communication prior to the elapsed time (TL) arriving at the specified time interval (TR);

storing, as a new specified time interval (TR) in the specified time interval storing portion, a time interval that is a real-number multiple of a value based on the reference time interval (THm) and or (TLm).

14. The controlling method as set forth in claim 13, wherein:

the upper limit reference time interval recording step uses, as the reference time interval (THm), a time interval that is the average of the elapsed times (TH) measured in the past, or uses, as the reference time interval (THm), a time interval that is the longest of the elapsed times (TH) measured in the past;

the lower limit reference time interval recording step uses, as the reference time interval (TLm), a time interval that is the average of the elapsed times (TL) measured in the past, or uses, as the reference time interval (TLm), a time interval that is the longest of the elapsed times (TL) measured in the past; and the specified time interval setting step sets, as a new specified time interval (TR), a time interval that is a real-number multiple of the reference time interval (THm) or (TLm), whichever is longer, or sets, as a new specified time interval (TR) the average time interval of the reference time intervals (THm) and (TLm).

15. The controlling method as set forth in claim 12, further comprising:

storing, as a new specified time interval (TR), a specified time interval that has been transmitted, at least one of when a specified time interval to be set is transmitted simultaneously with the transmission of a manipulated variable upper limit value (OH1) and a manipulated variable lower limit value (OL1) that is to be set, from the higher-level device.

* * * * *